United States Patent Office 2,819,968
Patented Jan. 14, 1958

2,819,968
FEED COMPOSITION

Robert W. Colby, Lake Jackson, Tex., and Robert J. Mesler, Jr., Midland, Mich., assignors to The Dow Chemical Company, Midland, Mich., a corporation of Delaware No Drawing. Application March 1, 1954
Serial No. 413,439

2 Claims. (Cl. 99—2)

This invention is concerned with feed compositions for ruminants and is particularly directed to such compositions which comprise an additive as a source of usable nitrogen to supplement the protein content of feeds from natural sources.

The continuing rapid growth of human population without concurrent development of new areas of arable land has imposed an increasing stress on agriculturists to produce more food products per acre of the land now under tillage. In meeting this problem with respect to the raising of meat animals such as sheep and beef cattle, there has been developed the feed-lot method in which animals are not allowed to range over a wide area of grazing land but rather are collected into limited areas for intensive feeding. In such operations, a major item of expense is the provision of the protein foods required for the growth of the animals. In the past it has been the practice to employ as supplements protein-rich feedstuffs such as cottonseed meal and soybean meal.

More recently, it has been found that a portion of the protein requirements of ruminants may be supplied in the form of urea. The urea-nitrogen is converted by the microorganisms of the rumen into protein utilizable by the ruminants. This conversion of urea-nitrogen to protein has made possible the formulation of feed compositions containing a high protein-equivalent in the form of inexpensive and commercially available synthetic urea in place of a substantial proportion of the expensive natural protein feedstuffs formerly employed.

The use of urea, however, has not provided an adequate solution to the above-described problem. Urea is highly water-soluble with the result that the urea-nitrogen may pass rapidly through the digestive system before the rumen microorganisms are able to utilize it. Moreover, considerable quantities of ammonia may be formed from urea by hydrolysis and either be lost from the rumen or prove toxic to the consuming animal.

It is an object of the present invention to provide a new nitrogen-containing additive to supplement the protein portion of ruminant feed. It is a further object to provide such protein supplement in relatively stable and non-toxic form. Yet another object is to provide a synthetic organic nitrogen compound suitable for supplementing feed for ruminants and characterized by a high proportion of available nitrogen in said compound. Other objects will become apparent from the following specification and claims.

According to the present invention, it has been discovered that melamine can be used as a source of nitrogen to supplement the protein feed of ruminants. It is among the advantages of the invention that melamine contains a high proportion of available nitrogen which is relatively stable to hydrolysis yet utilizable by the rumen microorganisms.

In the practice of the invention, the melamine may be incorporated in the feed in any suitable fashion. In one method of operation, the melamine in crystalline form may be mixed together with other feed constituents in a chopper, mechanical mixer or the like. In another method of operation, a warm concentrated solution of melamine may be sprayed onto a prepared feed and then passed to a mechanical mixer and drier. Similarly, melamine may be admixed in either crystalline or solution form with feeds which are thereafter submitted to a pelleting process or the like.

The proportions of melamine to be employed in feed compositions may vary widely depending upon whether the composition is a concentrate designed for later admixture with other feed constituents or whether a balanced complete ration is prepared. The amount of supplemental nitrogen required depends upon the nitrogen content of the unsupplemented ration of the animals and any desired amount of melamine may be employed up to an amount equivalent to all the supplemental nitrogen required beyond that furnished in the grain and roughage being fed concurrently. In practice, it is generally desirable to regulate the amount of melamine in the feed so as to provide from about 5 to 50 percent and preferably from about 25 to 40 percent of the total nitrogen intake of the ruminant in the form of melamine.

In the preparation of feed concentrates for supplementing the predominantly carbohydrate materials such as hay, ground corn cobs and the like, compositions containing from about 5 to 90 percent by weight of melamine are suitable. The remainder of the concentrate may consist of any one or more of various suitable feed supplements or edible additaments such as wheat bran, alfalfa meal, oil meal from soybeans, linseed, cottonseed or coconut, salt, minerals, distillers' and brewers' by-products, vitamin supplements and the like.

The following examples illustrate the invention, but are not to be construed as limiting the same.

Example 1

A feed supplement to be employed for increasing the nitrogen level of predominantly carbohydrate feedstuffs is prepared by mechanically mixing the following ingredients:

| Material: | Parts by weight |
|---|---|
| Wheat bran | 200 |
| Ground corn | 1150 |
| Cottonseed meal | 360 |
| Melamine | 76 |
| Molasses | 168 |
| Minerals and salt | 46 |

Example 2

A finished feed mixture suitable for dairy cattle or feed-lot diets for ruminants is prepared by grinding and mechanically mixing the following:

| Material: | Parts by weight |
|---|---|
| Timothy hay | 960 |
| Dehydrated alfalfa | 40 |
| Yellow corn | 600 |
| Corn starch | 320 |
| Iodized salt | 10 |
| Bone meal | 20 |
| Sea salt | 2 |
| Soybean meal | 30 |
| Melamine | 18 |
| Cobalt sulfate | 0.01 |

Example 3

A feed concentrate, containing a high proportion of available nitrogen and suitable for mixing with silage, hay, ground grain or the like to obtain supplemented feeds, is prepared by intimately admixing the following:

| Material: | Parts by weight |
|---|---|
| Melamine | 400 |
| Dehydrated alfalfa | 50 |
| Iodized salt | 20 |
| Steamed bone meal | 30 |

*Example 4*

A supplemental feed, to be employed with high roughage diets for ruminants, is prepared by mechanically mixing the following ingredients:

| Material: | Parts by weight |
|---|---|
| Wheat bran | 250 |
| Distillers' dried grains | 250 |
| Dehydrated alfalfa | 100 |
| Rolled oats | 200 |
| Ground corn | 520 |
| Iodized salt | 20 |
| Steamed bone meal | 30 |
| Sea salt | 2 |
| Molasses | 170 |
| Cottonseed meal | 300 |
| Melamine | 120 |
| Brewers' dried grains | 38 |
| Cobalt sulfate | 0.01 |

*Example 5*

A feed composition is prepared by mixing together the following ingredients:

| Material: | Parts by weight |
|---|---|
| Ground timothy hay | 50 |
| Ground yellow corn | 30 |
| Corn starch | 16.9 |
| Iodized salt | 0.5 |
| Steamed bone meal | 1.0 |
| Sea salt | 0.1 |
| Soybean meal | 1.5 |
| Melamine | 0.7 |

The above composition is fed to four yearling sheep maintained in metabolism cages so that food intake and excretions can be determined. Following a nine-day period of adjustment to the feed, the sheep show an average intake of 42.1 grams of nitrogen per sheep over a five-day period. The nitrogen excretion in this period averages 35.7 grams per sheep, giving an average positive nitrogen balance of 6.4 grams per sheep.

In an exactly similar determination employing 1.2 parts of urea instead of the 0.7 part of melamine in the above diet, 4 yearling sheep show an average positive nitrogen balance of only 0.85 gram per sheep for the five-day period.

We claim:

1. A ruminant feed composition which comprises protein, carbohydrate and from about 5 to 50 percent by weight of the total available nitrogen of the composition in the form of melamine.

2. A ruminant feed concentrate adapted for mixing with carbohyrate and roughage feeds to prepare ruminant feeds of enhanced available nitrogen content which comprises an edible ruminant feed supplement and in admixture therewith from about 5 to 90 percent by weight of melamine based on the total weight of the finished composition.

References Cited in the file of this patent

UNITED STATES PATENTS

| 2,592,565 | Harvey | Apr. 15, 1952 |
| 2,630,386 | Walker | Mar. 3, 1953 |
| 2,687,354 | Gribbins | Aug. 24, 1954 |